(12) United States Patent
Mizusaki et al.

(10) Patent No.: US 10,989,950 B2
(45) Date of Patent: Apr. 27, 2021

(54) CAMERA MODULE OPTICAL SHUTTER AND PRODUCTION METHOD THEREOF

(71) Applicant: SHARP KABUSHIKI KAISHA, Osaka (JP)

(72) Inventors: Masanobu Mizusaki, Sakai (JP); Kiyoshi Minoura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 239 days.

(21) Appl. No.: 16/147,461

(22) Filed: Sep. 28, 2018

(65) Prior Publication Data

US 2019/0094578 A1 Mar. 28, 2019

(30) Foreign Application Priority Data

Sep. 28, 2017 (JP) ............................. JP2017-188806

(51) Int. Cl.
| | |
|---|---|
| *G02F 1/1334* | (2006.01) |
| *G02F 1/1343* | (2006.01) |
| *G02F 1/1339* | (2006.01) |
| *G02F 1/1341* | (2006.01) |
| *G03B 9/08* | (2021.01) |
| *G02F 1/1333* | (2006.01) |

(52) U.S. Cl.
CPC .......... *G02F 1/1334* (2013.01); *G02F 1/1339* (2013.01); *G02F 1/1341* (2013.01); *G02F 1/13439* (2013.01); *G03B 9/08* (2013.01); *G02F 1/133345* (2013.01); *G02F 2001/13345* (2013.01); *G02F 2001/13415* (2013.01)

(58) Field of Classification Search
CPC .... G02F 1/1334; G02F 1/1339; G02F 1/1341; G02F 1/13439
See application file for complete search history.

(56) References Cited

U.S. PATENT DOCUMENTS

| | | | | |
|---|---|---|---|---|
| 6,304,308 | B1* | 10/2001 | Saito ................. | G02F 1/133512 349/110 |
| 2002/0008837 | A1* | 1/2002 | Hisamitsu ........... | G02F 1/13718 349/175 |
| 2004/0266937 | A1* | 12/2004 | Yagi ..................... | B60C 1/0016 524/493 |
| 2005/0219456 | A1 | 10/2005 | Tadaki et al. | |

(Continued)

FOREIGN PATENT DOCUMENTS

| | | |
|---|---|---|
| CN | 1677196 A | 10/2005 |
| CN | 105974675 A | 9/2016 |
| JP | 2007-208587 A | 8/2007 |

*Primary Examiner* — Lucy P Chien
(74) *Attorney, Agent, or Firm* — ScienBiziP, P.C.

(57) ABSTRACT

The present invention provides a highly reliable camera module optical shutter capable of preventing the occurrence of a streaky transparent portion in a polymer network liquid crystal layer in a scattering state, and a method for producing the camera module optical shutter. A camera module optical shutter includes a pair of substrates bonded together with a seal and a polymer network liquid crystal layer sealed between the substrates, wherein at least one of the substrates includes a transparent electrode made of an oxide conductive film and a silicon oxide layer covering the transparent electrode, and a silane coupling agent is bonded to a surface of the silicon oxide layer, the surface being in contact with the polymer network liquid crystal layer.

6 Claims, 2 Drawing Sheets

(56) References Cited

U.S. PATENT DOCUMENTS

2009/0283401 A1\* 11/2009 Zang .................. C09K 3/1018
　　　　　　　　　　　　　　　　　　　204/192.15
2011/0285940 A1\* 11/2011 Kubota ............ G02F 1/134336
　　　　　　　　　　　　　　　　　　　349/86

\* cited by examiner

CAMERA MODULE OPTICAL SHUTTER AND PRODUCTION METHOD THEREOF

CROSS-REFERENCE TO RELATED APPLICATIONS

The present application claims priority under 35 U.S.C. § 119 to Japanese Patent Application No. 2017-188806 filed on Sep. 28, 2017, the contents of which are incorporated herein by reference in their entirety.

BACKGROUND OF THE INVENTION

Field of the Invention

The present invention relates to camera module optical shutters and production methods thereof. More specifically, the present invention relates to a camera module optical shutter that employs a polymer network liquid crystal layer and a production method thereof.

Description of Related Art

Conventional cameras generally include a mechanical optical shutter in which one or more partition plates open and close at a high speed by the force of a spring. Due to various purposes such as reduction in size and thickness, impact resistance, production cost, and increase in speed, electrical optical shutters have been increasingly developed. Examples of electrical optical shutters include a shutter disclosed in JP 2007-208587 A which includes a dispersion-type liquid crystal element.

BRIEF SUMMARY OF THE INVENTION

Figure 3:
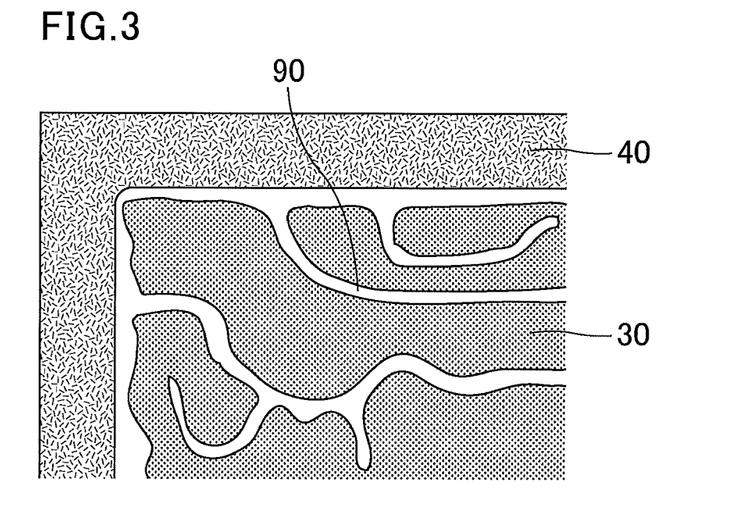
FIG. 3 illustrates a schematic plan view of a cracked-patterned defect that occurred in a conventional camera module optical shutter.

A polymer network liquid crystal (PNLC) layer has properties of scattering light when no voltage is applied and transmitting light when a voltage is applied. The present inventors focused on production of a camera module optical shutter that uses such properties of a PNLC layer. The present inventors experimentally produced a PNLC cell for a camera module optical shutter including a PNLC layer between paired substrates bonded together with a seal, and found that a streaky transparent portion (hereinafter also referred to as "cracked-patterned defect") was generated in the PNLC layer in a scattering state. FIG. 3 illustrates a schematic plan view of a cracked-patterned defect that occurred in a conventional camera module optical shutter. According to studies of the present inventors, a cracked-patterned defect 90 occurred near a seal 40 that seals a PNLC layer 30 and the defect tended to develop over the entire surface of the PNLC layer 30. It was also found that the cracked-patterned defect 90 became noticeable when subjected to an aging test such as a high-temperature test.

The present invention was made in view of the current situation, and aims to provide a highly reliable camera module optical shutter capable of preventing the occurrence of a streaky transparent portion in a polymer network liquid crystal layer in a scattering state, and a method for producing the camera module optical shutter.

Figure 4A:
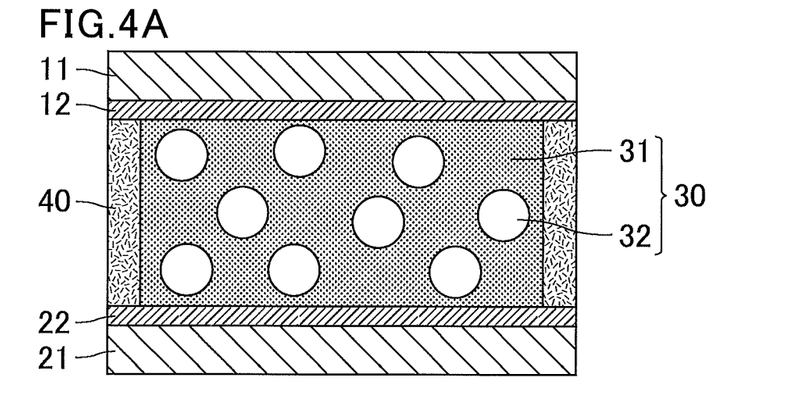
Figure 4B:
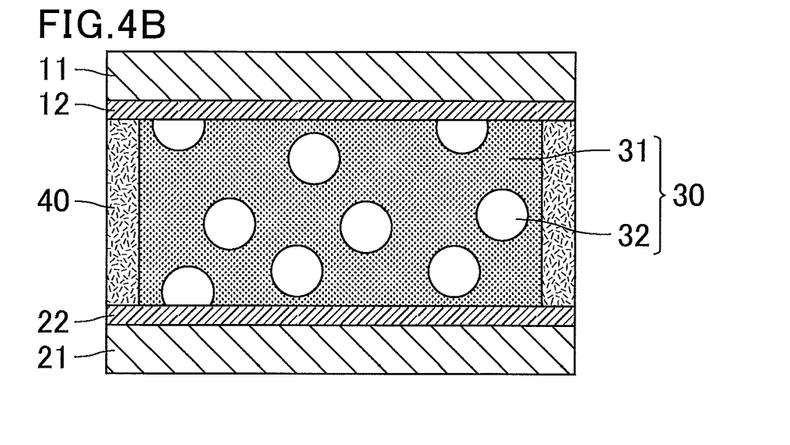

As a result of various studies on cracked-patterned defects, the present inventors predicted that the cause of the defects would be separation of a polymer network constituting the PNLC layer from the surface of a transparent electrode that is used to apply a voltage to the PNLC layer. With reference to FIGS. 4A and 4B, the following will describe the mechanism of occurrence of a cracked-patterned defect based on the prediction of the present inventors. FIGS. 4A and 4B each illustrate a schematic view of a cross section of a conventional camera module optical shutter. FIG. 4A illustrates a normal state and FIG. 4B illustrates a state with a cracked-patterned defect.

As illustrated in FIG. 4A, in a PNLC cell in a normal state, a polymer network 31 is in contact with transparent electrodes 12 and 22, and liquid crystal droplets 32 in the PNLC layer 30 are separated from the transparent electrodes 12 and 22. The transparent electrodes 12 and 22 are usually oxide conductive films such as indium tin oxide (ITO) electrodes. However, while oxide conductive films such as ITO electrodes are slightly hydrophilic, the polymer network 31 is hydrophobic, so that the polymer network 31 easily separates from the surfaces of the transparent electrodes 12 and 22. As illustrated in FIG. 4B, when the polymer network 31 separates, the liquid crystal droplets 32 in the PNLC layer 30 come into contact with the surfaces of the transparent electrodes 12 and 22, partially changing the interface of the liquid crystal in the PNLC cell. This changes the alignment state of the liquid crystal and disturbs the scattering state, thus generating a recognizable cracked-patterned defect. In particular near the seal 40, components of a sealant (a seal before curing) containing hydrophilic functional groups such as epoxy and hydroxyl groups may dissolve into the PNLC layer 30, so that the polymer network 31 is likely to have an uneven distribution, and a cracked pattern is considered to be easily generated near the seal 40 from the beginning of production.

Based on the prediction, the present inventors studied methods for preventing separation of the polymer network 31. While a silane coupling agent does not bind to the surfaces of the transparent electrodes 12 and 22, the present inventors formed a silicon oxide layer on each of the transparent electrodes 12 and 22 and allowed a silane coupling agent to bind to the surface of each of the transparent electrodes 12 and 22. As a result, they found that such a structure can prevent separation of the polymer network 31. Thus, the above issue was successfully solved, and the present invention was completed.

Specifically, according to a first embodiment, the present invention provides a camera module optical shutter including a pair of substrates bonded together with a seal and a polymer network liquid crystal layer sealed between the substrates, wherein at least one of the substrates includes a transparent electrode made of an oxide conductive film and a silicon oxide layer covering the transparent electrode, and a silane coupling agent is bonded to a surface of the silicon oxide layer, the surface being in contact with the polymer network liquid crystal layer.

According to a second embodiment, the present invention provides a method for producing a camera module optical shutter, the method including applying a silane coupling agent to a silicon oxide layer of a first substrate including a transparent electrode made of an oxide conductive film and the silicon oxide layer covering the transparent electrode; disposing an uncured sealant in a frame shape on the first substrate; dropping a liquid crystal material containing a polymer network forming monomer into a region surrounded by the uncured sealant and coated with the silane coupling agent on the first substrate; overlaying a second substrate on the first substrate via the uncured sealant; and curing the uncured sealant and polymerizing the polymer network forming monomer in the liquid crystal material.

The present invention provides a highly reliable camera module optical shutter capable of preventing generation of a streaky transparent portion in a polymer network liquid crystal layer in a scattering state, and a method for producing the camera module optical shutter.

BRIEF DESCRIPTION OF THE DRAWINGS

FIGS. 2A to 2C are different in stopper wall arrangement.

FIGS. 4A and 4B each illustrate a schematic view of a cross section of a conventional camera module optical shutter, FIG. 4A illustrates a normal state and FIG. 4B illustrates a state with a cracked-patterned defect.

DETAILED DESCRIPTION OF THE INVENTION

Hereinafter, the present invention is described in further detail based on embodiments with reference to the drawings. The embodiments are not intended to limit the scope of the present invention.

Figure 1:
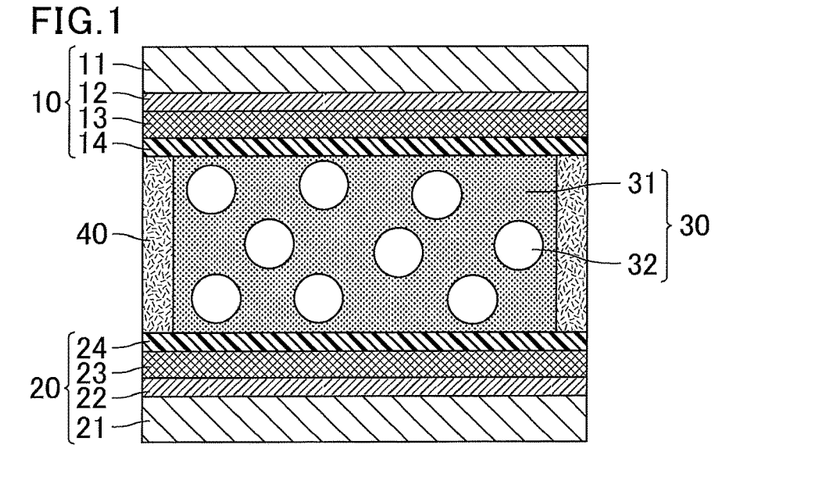
FIG. 1 illustrates a schematic view of a cross section of a camera module optical shutter of an embodiment.

FIG. 1 illustrates a schematic view of a cross section of a camera module optical shutter of an embodiment. The camera module optical shutter of the present embodiment has a structure in which the polymer network liquid crystal (PNLC) layer 30 is disposed between a first substrate 10 and a second substrate 20 bonded together with the seal 40, and the structure is also referred to as a "PNLC cell". The first substrate 10 has a structure in which the transparent electrode 12, a silicon oxide layer 13 and a silane coupling-treated layer 14 are stacked on a transparent substrate 11, and the silane coupling-treated layer 14 is in contact with the PNLC layer 30. Likewise, the second substrate 20 has a structure in which the transparent electrode 22, a silicon oxide layer 23, and a silane coupling-treated layer 24 are stacked on a transparent substrate 21, and the silane coupling-treated layer 24 is in contact with the PNLC layer 30. An alignment film such as a polyimide film is not formed between the PNLC layer 30 and the first substrate 10 or between the PNLC layer 30 and the second substrate 20. Active elements such as TFTs may be unnecessary on the first substrate 10 and the second substrate 20.

The transparent substrates 11 and 21 may be glass substrates or plastic substrates, for example. The transparent electrodes 12 and 22 are made of oxide conductive films. Alignment of the liquid crystal in the PNLC layer 30 can be controlled by application of a voltage across the transparent electrode 12 and the transparent electrode 22. A large number of transparent electrodes 12 and 22 are not required for the camera module optical shutter, unlike a liquid crystal cell for a display device that includes many pixel electrodes arranged in a matrix, so that it is preferred to make the transparent electrodes 12 and 22 thin in order to increase transparency in a transmission state instead of making them thick in order to achieve low resistance. Specifically, the transparent electrodes 12 and 22 preferably have a thickness of 5 to 50 nm. If the transparent electrodes 12 and 22 have a thickness of less than 5 nm, the electrodes may not be uniformly formed on the substrates, possibly leaving small regions without electrodes. In such a case, the PNLC layer 30 cannot receive sufficient voltage. In contrast, if the transparent electrodes 12 and 22 have a thickness of more than 50 nm, a decrease in transmittance will be significant due to electrode materials, possibly failing to provide sufficient transmittance in the transmission state.

Examples of the oxide conductive films used in the transparent electrodes 12 and 22 include those containing indium tin oxide, zinc oxide, or tin oxide. In particular, an indium tin oxide (ITO) electrode is suitably used.

The silicon oxide layers 13 and 23 are layers made of silicon oxide represented by SiOx (x=1, 2). A silane coupling agent cannot chemically bind to the transparent electrodes 12 and 22. However, when the transparent electrodes 12 and 22 are covered with the silicon oxide layers 13 and 23, the silane coupling-treated layers 14 and 24 can be provided to the first substrates 10 and 20, respectively. Characteristics of the silicon oxide layers 13 and 23 applicable as base layers of the silane coupling-treated layers 14 and 24 are peculiar to the silicon oxide layers 13 and 23, so that the effects of the present invention cannot be obtained with, for example, a silicon nitride film. The silicon oxide layers 13 and 23 preferably have a thickness of 30 to 500 nm. If the silicon oxide layers 13 and 23 have a thickness of less than 30 nm, the transparent electrodes 12 and 22 may include regions that are not covered with the silicon oxide layers 13 and 23. In contrast, if the silicon oxide layers 13 and 23 have a thickness of more than 500 nm, scattering due to the silicon oxide layers 13 and 23 will increase, possibly failing to provide sufficient transmittance in the transmission state.

The silane coupling-treated layers 14 and 24 are suitably layers of a silane coupling agent bonded to the surfaces of the silicon oxide layers 13 and 23, respectively, the surfaces being in contact with the PNLC layer 30. The silane coupling-treated layers 14 and 24 may not necessarily be recognized as individual layers in a cross-sectional view of the PNLC cell, but are regarded as individual layers herein and in the accompanying drawings for convenience of description. The silane coupling agent may be of any type that contains functional groups capable of binding to an inorganic substance and hydrophobic units capable of binding to an organic substance. Upon binding of the functional groups capable of binding to an inorganic substance to the silicon oxide layers 13 and 23, the hydrophobic units are aligned near the PNLC layer 30 and interact with the polymer network 31 in the PNLC layer 30. This reduces or prevents separation of the polymer network 31 from the interfaces with the first substrate 10 and the second substrate 20. In particular, in the case where the hydrophobic units include polymerizable groups such as vinyl groups, it is possible to form a strong chemical bond through copolymerization during formation of the polymer network 31. This further improves the adhesion of the polymer network 31 to the substrate surfaces, providing a significant effect in preventing generation of a cracked pattern. In other words, preferably, the silane coupling agent contains polymerizable groups and the polymerizable groups form bonds with the polymer network 31.

For the PNLC cell, the following steps A1 to A4 can determine whether or not the silane coupling agent is bonded to the surfaces of the silicon oxide layers 13 and 23, the surfaces being in contact with the PNLC layer 30.

(Step A1)

First, a PNLC cell to be used for determination is broken down to separate the first substrate 10 and the second substrate 20. The liquid crystal attached to the surface of the target substrate is washed off to obtain a substrate to which the silicon oxide layer 13 or 23, the silane coupling-treated layer 14 or 24, and the polymer network 31 are attached. The liquid crystal can be washed off with a solvent such as hexane.
(Step A2)

Next, a chemical structure on the substrate surface is measured by time-of-flight secondary ion mass spectrometry (TOF-SIMS). A —Si—O— structure is detected in order to confirm a bond between SiO and the silane coupling agent.
(Step A3)

Next, the target substrate is immersed in a solvent capable of dissolving unreacted molecules of the silane coupling agent and the polymer network 31. The solvent may be acetone, toluene, or chloroform, for example. The solvent may be heated to about 60° C., if necessary. At this time, a product formed by a bond between SiO and the silane coupling agent will not dissolve.
(Step A4)

Next, the substrate treated in step A3 above is again subjected to TOF-SIMS to measure a chemical structure on the substrate surface. If the detection result of the —Si—O— structure is the same as the detection result in step A2 above, it can be determined that the silane coupling agent is bonded (chemisorbed) to the silicon oxide layer 13 or 23.

Further, for the PNLC cell, the following steps B1 to B4 can determine whether or not the silane coupling agent containing polymerizable groups is bonded to the polymer network 31 of the PNLC layer 30.
(Step B1)

First, a PNLC cell to be used for determination is broken down to separate the first substrate 10 and the second substrate 20. The liquid crystal attached to the surface of the target substrate is washed off to obtain a substrate to which the silicon oxide layer 13 or 23, the silane coupling-treated layer 14 or 24, and the polymer network 31 are attached. The liquid crystal can be washed off with a solvent such as hexane.
(Step B2)

Next, a chemical structure on the substrate surface is measured by Fourier transform infrared spectroscopy (FT-IR). An alkyl structure ((—C—C—)n) of a polymer backbone is detected in order to confirm a bond between the polymer network 31 and the silane coupling agent.
(Step B3)

Next, the target substrate is immersed in a solvent capable of dissolving unreacted molecules of the silane coupling agent and the polymer network 31. The solvent may be acetone, toluene, or chloroform, for example. The solvent may be heated to about 60° C., if necessary. At this time, a product formed by a bond between the polymer network 31 and the silane coupling agent will not dissolve.
(Step B4)

Next, the substrate treated in step B3 above is again subjected to FT-IR to measure a chemical structure on the substrate surface. If the detection result of the alkyl structure is the same as the detection result in step B2 above, it can be determined that the silane coupling agent is bonded (chemisorbed) to the polymer network 31.

Example of the silane coupling agent for the silane coupling-treated layers 14 and 24 include those represented by the following formulas (1) to (3).

$(CH_3O)_3Si-Z$ (1)

$(C_2H_5O)_3Si-Z$ (2)

$Cl_3Si-Z$ (3)

Z in the above formulas (1) to (3) may be any of the following polymerizable groups, for example.

—CH=CH$_2$

—C$_6$H$_4$—CH=CH$_2$

—C$_3$H$_6$OCOC(CH$_3$)=CH$_2$

—C$_3$H$_6$OCOCH=CH$_2$

Z in the above formulas (1) to (3) may be any of the following hydrophobic groups without polymerizable groups. In the following formulas, n is an integer of 2 to 24.

—(CH$_2$)$n$-CH$_3$

—(CH$_2$)$n$-CF$_3$

—(CH$_2$)$n$-C$_2$F$_5$

—C$_3$H$_6$OCH$_2$CH—CH$_3$

—C$_3$H$_6$N=C(C$_4$H$_9$)(CH$_3$)

—C$_3$H$_6$NHC$_6$H$_5$

—C$_6$H$_5$

—(CH$_2$)$_6$—Si(OCH$_3$)$_3$

—(CH$_3$)$_3$—SiNHSi—(CH$_3$)$_3$

The polymer network liquid crystal (PNLC) layer 30 has a structure in which the liquid crystal droplets 32 are present in the polymer network (also referred to as a "polymer matrix") 31. The polymer network 31 can be formed by irradiating a polymer network forming monomer dissolved in the liquid crystal material with ultraviolet light to polymerize the monomer. The polymer network forming monomer may be an acrylic monomer, for example. Liquid crystal molecules in the liquid crystal droplets 32 scatter light when no voltage is applied. When a voltage is applied across the transparent electrodes 12 and 22 disposed to face each other with the PNLC layer 30 therebetween, the liquid crystal molecules align in one direction according to the electric field to allow transmission of light. In other words, it is possible to switch between the scattering state and transmission state by applying or not applying a voltage across the transparent electrodes 12 and 22.

The PNLC layer 30 preferably has a thickness (cell thickness) of 10 to 25 μm. If the PNLC layer 30 has a thickness of less than 10 μm, the scattering intensity is reduced, so that the camera module optical shutter may not have desired light-shielding properties. If the PNLC layer 30 has a thickness of more than 25 μm, the PNLC layer 30 has slow switching response, so that the camera module optical shutter may not have desired responsivity. The PNLC cell is thicker than general liquid crystal cells (about 5 μm) for display devices. Thus, stress resulting from formation of the polymer network 31 and curing of the sealant during the production and from thermal cycles in the reliability test tends to be high, which is considered to be one of the factors that cause a cracked-patterned defect.

The seal 40 is a sealing member disposed between the first substrate 10 and the second substrate 20 to bond these substrates together with a predetermined gap therebetween. The seal 40 is disposed in a frame shape along the edges of the first substrate 10 and the second substrate 20, and the PNLC layer 30 is sealed in the space surrounded by the first substrate 10, the second substrate 20, and the seal 40. The seal 40 can be formed by applying a sealant with a dispenser or the like and curing the sealant. The sealant may be an adhesive composition containing an acrylic monomer, for example. The sealant may be one that is cured by heat, ultraviolet light, or ultraviolet light and heat. With the use of a sealant that is cured by ultraviolet light, it is possible to cure the sealant and form the polymer network 31 simultaneously by ultraviolet light irradiation.

The predetermined gap (gap between the first substrate 10 and the second substrate 20) is controlled by spacers (not illustrated). Examples of the spacers include plastic beads and photospacers. Plastic beads may be mixed into the sealant. Photo spacers can be formed by patterning photosensitive resin (resist) by photolithography.

Although not illustrated in FIG. 1, at least one wall member may be disposed to surround the center of the PNLC layer 30 in the region surrounded by the seal 40 between the first substrate 10 and the second substrate 20. The at least one wall member is also referred to as a "stopper wall" because it is disposed in order to protect the uncured sealant from pressure of the liquid crystal material. In the case of providing the PNLC layer 30 by one drop filling (ODF) method, the sealant is applied with a dispenser or like, the liquid crystal material containing the polymer network forming monomer is dropped onto the first substrate 10 or the second substrate 20 (one of the substrates) to which the second substrate 20 or the first substrate 10 (the other substrate) is then bonded. As the substrates are bonded together, the liquid crystal material is spread out to fill the region surrounded by the seal 40. In the case where the method that simultaneously cures the sealant and forms the polymer network 31 is used, the sealant is in an uncured state at the time of bonding. Thus, due to the pressure of the liquid crystal material spread out, a missing part may be generated in the arrangement pattern of the frame shape of the sealant. Therefore, the stopper wall is disposed between the dropping position of the liquid crystal material and the sealant so as to protect the uncured sealant from the pressure of the liquid crystal material. The stopper wall is preferably disposed outside a region where the transparent electrodes 12 and 22 are disposed (hereinafter such a region is also referred to as an "active area"). The arrangement pattern of the stopper wall is not particularly limited. For example, a stopper wall having a frame shape may be disposed, or multiple linear stopper walls may be disposed in a frame shape. The height of the stopper wall is preferably 0.8 to 1 times, more preferably 0.95 to 1 times the cell thickness of the PNLC cell. If the height of the stopper wall is less than 0.8 times the cell thickness, the monomer-containing liquid crystal material is more likely to contact the uncured sealant. In contrast, if the height of the stopper wall is greater the cell thickness (thickness of the PNLC layer 30), the cell thickness may not be appropriately controlled.

Figure 2A:
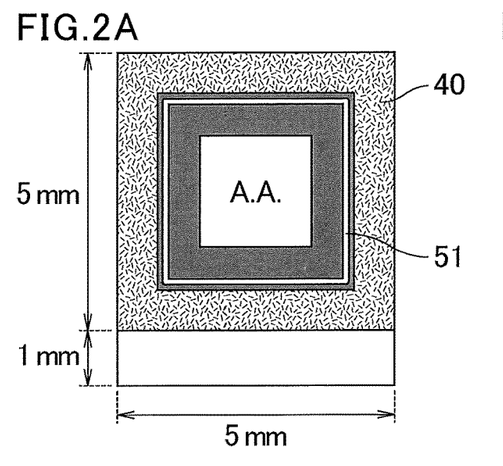
FIGS. 2A to 2C each illustrate an exemplary schematic plan view of the camera module optical shutter of the embodiment.
Figure 2B:
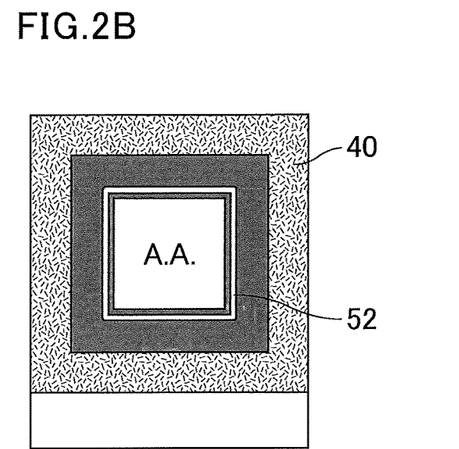
Figure 2C:
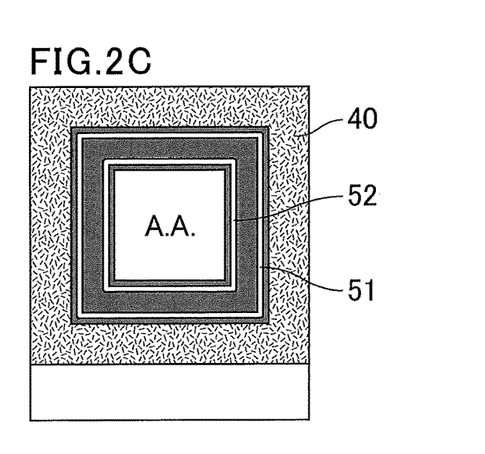

FIGS. 2A to 2C each illustrate an exemplary schematic plan view of the camera module optical shutter of the embodiment. FIGS. 2A to 2C are different in stopper wall arrangement. As illustrated in FIG. 2A, a stopper wall 51 may be disposed near the seal 40. The stopper wall 51 is disposed 0.1 to 0.5 mm away from the inner boundary of the seal 40, for example. Alternatively, as illustrated in FIG. 2B, a stopper wall 52 may be disposed near the active area (A. A.). The stopper wall 52 is disposed 0.1 to 0.5 mm away from the outer boundary of the active area (A. A.). Further, as illustrated in FIG. 2C, both the stopper wall 51 and the stopper wall 52 may be disposed. In other words, the stopper walls may be disposed to surround the center of the PNLC layer 30 two times or three times or more.

In the example illustrated in FIG. 2, the substrate to which the sealant is applied has a size of 6 mm×5 mm. A light shielding area having a width of 0.3 to 1 mm is disposed in a frame shape to surround the active area (A. A.), and the seal 40 having dimensions of 5 mm×5 mm with a width of 0.3 to 1.2 mm is formed in a frame shape to surround the light shielding area. The stopper wall 51 and/or the stopper wall 52 are/is disposed so as to surround the active area (A. A.) in the light shielding area.

The stopper walls 51 and 52 can be formed on the first substrate 10 or the second substrate 20 using photosensitive resin (resist) by photolithography. The stopper walls 51 and 52 may be formed simultaneously with photospacers that are disposed between the first substrate 10 and the second substrate 20 in order to control the cell thickness.

The method for producing a camera module optical shutter of the present embodiment is not particularly limited, but preferably includes the following steps (1) to (5):

(1) applying a silane coupling agent to the silicon oxide layer 13 of the first substrate 10 including the transparent electrode 12 made of an oxide conductive film and the silicon oxide layer 13 covering the transparent electrode 12;

(2) disposing an uncured sealant in a frame shape on the first substrate 10;

(3) dropping a liquid crystal material containing a polymer network forming monomer into a region surrounded by the uncured sealant and coated with the silane coupling agent on the first substrate 10;

(4) overlaying the second substrate 20 on the first substrate 10 via the uncured sealant; and (5) curing the uncured sealant and polymerizing the polymer network forming monomer in the liquid crystal material.

Step (5) is preferably conducted by ultraviolet light irradiation. This makes it possible to simultaneously cure the sealant and form the polymer network 31 by a simple method.

In the case where the silane coupling agent to be applied in step (1) contains polymerizable groups, it is preferred to react these polymerizable groups of the silane coupling agent with polymerizable groups of the polymer network forming monomer when the polymer network forming monomer is polymerized in step (5). This further improves the adhesion of the polymer network 31 to the substrate surfaces, providing a significant effect in preventing generation of a cracked pattern.

The method for producing a camera module optical shutter of the present embodiment may include step (6) of forming at least one wall member (the stopper wall 51 and/or the stopper wall 52) on the first substrate 10. Step (6) preferably precedes step (1). One or more wall members are preferably disposed to surround the dropping position of the liquid crystal material in the region to be surrounded by the uncured sealant. This makes it possible to protect the uncured sealant from pressure of the liquid crystal material that is spread in step (4). The wall members may be disposed to repeatedly surround the dropping position of the liquid crystal material in the region to be surrounded by the uncured sealant.

For use, the camera module optical shutter of the present embodiment is incorporated into a camera module. The camera module optical shutter may be an optical shutter disposed on the light-emitting side or an optical shutter disposed on the light-receiving side. The camera module optical shutter that is disposed on the light-emitting side is used to control transmission and blockage of light emitted by a light source. The camera module optical shutter that is disposed on the light-receiving side is used to control transmission and blockage of light incident on a light receiving unit such as a light receiving element. The camera module may include multiple camera module optical shutters of the present embodiment, or the camera module optical shutter of the present embodiment may include multiple active areas. The light to be controlled by the optical shutter is not limited to visible light and may be infrared light or ultraviolet light. The camera module is used, for example, in a digital camera, a smartphone, or a tablet personal computer.

The present invention is described in further detail below with reference to examples and comparative examples, but the present invention is not limited to these examples.

Example 1

Two colorless and transparent glass substrates were prepared, each including a 30-nm thick ITO electrode on one of its surfaces. Each of the two substrates was subjected to the following treatments. Here, one of the two glass substrates included columnar photospacers having a height of 15 μm and a stopper wall having a height of 15 μm illustrated in FIG. 2A, on the surface where the ITO electrode was formed.

First, $SiO_2$ was vapor-deposited on the surface of each ITO electrode to form a 300-nm thick $SiO_2$ film. Subsequently, a solution of a silane coupling agent represented by a structural formula (1) below was applied to the $SiO_2$ film, followed by standing in a 60° C. oven for 40 minutes to allow the silane coupling agent to bind to the $SiO_2$ film. Thus, a silane coupling agent-treated layer was formed. Subsequently, the surface of the silane coupling agent-treated layer was washed with ethanol and then acetone to remove unreacted part of the silane coupling agent.

$(C_2H_5O)_3SiCH=CH_2$ (1)

Subsequently, a sealant ("Photolec S" available from Sekisui Chemical Co., Ltd.) curable by ultraviolet light and heat was applied in a specific pattern with a dispenser to the surface of only one of the two substrates. After application, a PNLC material (DIC Corporation) was dropped onto the substrate. The PNLC material was a monomer containing polymerizable functional groups (multiple vinyl groups) mixed into a liquid crystal. The PNLC material had the following characteristics.

Tni (phase transition temperature) of host liquid crystal=70° C.

Δn (refractive index anisotropy)=0.2

Δε (anisotropy of dielectric constant)=8

Subsequently, the other substrate was bonded to the above substrate, and the substrates were irradiated with ultraviolet light (2.5 J/cm²) having a wavelength of 365 nm at 18° C. to simultaneously cure the sealant and polymerize the monomer in the PNLC material. At this time, with the polymerization of the monomer, not only a polymer network but also bonds between polymerizable groups (vinyl groups) in each silane coupling agent-treated layer and the polymer network were formed. Subsequently, the substrates were heated in a 130° C. oven for one hour to completely cure the sealant.

Thus, a PNLC cell including a PNLC layer between the paired substrates bonded with the cured sealant (seal) was completed. The PNLC cell was able to apply a voltage to the PNLC layer through the ITO electrodes provided on the two substrates, and functioned as an optical shutter that switches between the scattering state during no voltage application and the transmission state during voltage application.

Comparative Example 1

A PNLC cell was produced in the same manner as in Example 1, except that the $SiO_2$ films and the silane coupling agent-treated layers were not formed.

Comparative Example 2

A PNLC cell was produced in the same manner as in Example 1, except that the $SiO_2$ films were not formed.

Comparative Example 3

A PNLC cell was produced in the same manner as in Example 1, except that a 300-nm thick SiN film was formed by chemical vapor deposition (CVD) instead of the $SiO_2$ film on the surface of each ITO electrode.

<Evaluation Method>

The following evaluation tests were performed on the PNLC cells produced in Example 1 and Comparative Examples 1 to 3. Table 1 tabulates the obtained results.

(Observation for Presence or Absence of Cracked Pattern)

Whether or not the PNLC cell during no voltage application exhibited a streaky transparent portion (cracked pattern) was checked by visual observation with a microscope.

(Haze)

The haze of the PNLC cell during no voltage application was measured at 25° C. using "NDH 7000" available from Nippon Denshoku Industries Co., Ltd.

(Response Characteristics)

Using "Photal 5200" available from Otsuka Electronics Co., Ltd., response characteristics of the PNLC cell was measured between 0.5 V and 20 V at 25° C. to check rising response time (0.5 V→20 V) and falling response time (20 V→0.5 V).

(Aging Test)

The PNLC cell was stored in a −20° C. oven for 500 hours, and then observed for the presence or absence of a cracked pattern in the same manner as described above.

TABLE 1

| | Initial state | | | | After 500- |
|---|---|---|---|---|---|
| | Cracked pattern | Haze (%) | Rising response time (ms) | Falling response time (ms) | hour aging Cracked pattern |
| Example 1 | Absent | 92 | 2.3 | 5.8 | Absent |
| Comparative Example 1 | Present (near sealing member) | 92 | 2.3 | 5.7 | Present (expanded) |
| Comparative Example 2 | Present (near sealing member) | 92 | 2.2 | 6.0 | Present (expanded) |
| Comparative Example 3 | Present (near sealing member) | 92 | 2.2 | 5.9 | Present (expanded) |

As is clear from Table 1, in the PNLC cell of Example 1 in which the $SiO_2$ film and the silane coupling agent-treated layer were formed on each ITO electrode, no cracked pattern (defect) was observed near the seal in either the initial state or after the aging test for storage at −20° C. for 500 hours. In contrast, the PNLC cell of Comparative Example 1 in which the $SiO_2$ films and the silane coupling agent-treated layers were not formed showed a cracked pattern near the seal in the initial state, and the cracked pattern expanded after the aging test. Likewise, the PNLC cell of Comparative Example 2 in which the $SiO_2$ films were not formed but the silane coupling agent-treated layers were formed and the PNLC cell of Comparative Example 3 in which the silane coupling agent-treated layers were formed on the respective SiN films instead of the $SiO_2$ films also showed cracked patterns in the initial state. These results indicate that although the silane coupling agent was used, the silane coupling agent could not be adsorbed on the surfaces of the ITO electrodes or the SiN films by chemical bonds, thus substantially failing to form the silane coupling agent-treated layers in the PNLC cells of Comparative Examples 2 and 3. The above reveals that application of the silane coupling agent to the $SiO_2$ films provides an effect that prevents the cracked-patterned defect. The PNLC cell of Example 1 in which the $SiO_2$ films and the silane coupling agent-treated layers were formed showed haze and response characteristics comparable to those of the PNLC cell of Comparative Example 1 in which the $SiO_2$ films and the silane coupling agent layers were not formed.

Example 2

A PNLC cell was produced in the same manner as in Example 1, except that a compound represented by the following structural formula (2) was used as a silane coupling agent.

(2)

Example 3

A PNLC cell was produced in the same manner as in Example 1, except that a compound represented by the following structural formula (3) was used as a silane coupling agent.

(3)

<Evaluation Method>

The evaluation test was performed on the PNLC cells produced in Examples 2 and 3. Table 2 tabulates the obtained results.

TABLE 2

|  | Initial state | | | | After 500-hour aging |
|---|---|---|---|---|---|
|  | Cracked pattern | Haze (%) | Rising response time (ms) | Falling response time (ms) | Cracked pattern |
| Example 2 | Absent | 92 | 2.4 | 5.7 | Absent |
| Example 3 | Absent | 92 | 2.3 | 5.9 | Absent |

As is clear from Table 2, no cracked pattern was generated even when the type of the silane coupling agent was changed to the one represented by the formula (2) or (3). In addition, the haze and response characteristics did not decrease.

Examples 4 to 8

A PNLC cell was produced in the same manner as in Example 1, except that the heights of the photospacers and the stopper wall were changed as follows.
Example 4: 5 μm
Example 5: 10 μm
Example 1: 15 μm
Example 6: 20 μm
Example 7: 25 μm
Example 8: 30 μm <Evaluation Method>

The evaluation test was performed on the PNLC cells produced in Examples 4 to 8. Table 3 tabulates the obtained results. Table 3 also tabulates the evaluation results of the PNLC cell produced in Example 1 for comparison.

TABLE 3

|  | Initial state | | | | After 500-hour aging |
|---|---|---|---|---|---|
|  | Cracked pattern | Haze (%) | Rising response time (ms) | Falling response time (ms) | Cracked pattern |
| Example 4 | Absent | 88 | 0.9 | 2.1 | Absent |
| Example 5 | Absent | 92 | 1.6 | 4.0 | Absent |
| Example 1 | Absent | 92 | 2.3 | 5.8 | Absent |
| Example 6 | Absent | 92 | 3.7 | 8.4 | Absent |
| Example 7 | Absent | 93 | 6.2 | 14.9 | Absent |
| Example 8 | Absent | 94 | 9.0 | 21.7 | Absent |

As is clear from Table 3, no cracked pattern was generated even when the height of the photospacers (cell thickness) was changed in the range of 5 to 30 μm. However, the PNLC cell of Example 4 in which the cell thickness was 5 μm had a haze of less than 90% and was not sufficient for use as an optical shutter. In contrast, the PNLC cell of Example 8 in which the cell thickness was 30 μm showed a significant decrease in response characteristics. Thus, the cell thickness in the range of 10 to 25 μm is considered to be appropriate for use as an optical shutter.

Example 9

Two colorless and transparent glass substrates were prepared, each including a 30-nm thick ITO electrode on one of its surfaces. Each of the two substrates was subjected to the following treatments. One of the two glass substrates included columnar photospacers having a height of 15 μm and a stopper wall having a height of 15 μm illustrated in FIG. 2C, on the surface where the ITO electrode was formed.

First, $SiO_2$ was vapor-deposited on the surface of each ITO electrode to form a 200-nm thick $SiO_2$ film. Subsequently, a solution of a silane coupling agent represented by a structural formula (4) below was applied to the $SiO_2$ film, followed by standing in a 60° C. oven for 40 minutes to allow the silane coupling agent to bind to the $SiO_2$ film. Thus, a silane coupling agent-treated layer was formed. Subsequently, the surface of the silane coupling agent-treated layer was washed with isopropyl alcohol and then acetone to remove unreacted part of the silane coupling agent.

(4)

Subsequently, a sealant ("Photolec S" available from Sekisui Chemical Co., Ltd.) curable by ultraviolet light and heat was applied in a specific pattern with a dispenser to the surface of only one of the two substrates. After application, a PNLC material (DIC Corporation) was dropped onto the substrate. The PNLC material was a monomer containing polymerizable functional groups (multiple vinyl groups) mixed into a liquid crystal. The PNLC material had the following characteristics.

Tni (phase transition temperature) of host liquid crystal=73° C.
Δn (refractive index anisotropy)=0.21
Δε (anisotropy of dielectric constant)=7.5

Subsequently, the other substrate was bonded to the above substrate, and the substrates were irradiated with ultraviolet light (3 J/cm²) having a wavelength of 365 nm at 20° C. to simultaneously cure the sealant and polymerize the monomer in the PNLC material. At this time, with the polymerization of the monomer, the irradiation results in not only a polymer network but also bonds between polymerizable groups (vinyl groups) in each silane coupling agent-treated layer and the polymer network. Subsequently, the substrates were heated in a 130° C. oven for one hour to completely cure the sealant.

Thus, a PNLC cell including a PNLC layer between the paired substrates bonded with the cured sealant (seal) was completed. The PNLC cell was able to apply a voltage to the PNLC layer through the ITO electrodes provided on the two substrates, and functioned as an optical shutter that switches between the scattering state during no voltage application and the transmission state during voltage application.

Example 10

A PNLC cell was produced in the same manner as in Example 9, except that a compound represented by the following structural formula (5) was used as a silane coupling agent.

$(C_2H_5O)_3Si—(CH_2)_{11}—CF_3$ (5)

Example 11

A PNLC cell was produced in the same manner as in Example 9, except that a compound represented by the following structural formula (6) was used as a silane coupling agent.

$(C_2H_5O)_3Si—(CH_2)_n—C_2F_5$ (6)

<Evaluation Method>

The evaluation test was performed on the PNLC cells produced in Examples 9 to 11. Table 4 tabulates the obtained results.

TABLE 4

| | Initial state | | | After 500- |
| | | | | hour aging |
| | Cracked pattern | Haze (%) | Rising response time (ms) | Falling response time (ms) | Cracked pattern |
| --- | --- | --- | --- | --- | --- |
| Example 9 | Absent | 91 | 2.4 | 6.0 | Absent |
| Example 10 | Absent | 91 | 2.4 | 5.7 | Absent |
| Example 11 | Absent | 91 | 2.3 | 5.7 | Absent |
| Example 1 | Absent | 92 | 2.3 | 5.8 | Absent |

As is clear from Table 4, even when the silane coupling agent containing only hydrophobic groups without polymerizable groups was used (Examples 9 to 11), no cracked pattern was generated and the response characteristics were comparable to those in Example 1. Examples 9 to 11 showed slightly lower haze compared to Example 1 and some other examples. This is presumably because use of the silane coupling agent containing no polymerizable groups slightly decreases the polymer density near the interface of each silane coupling agent-treated layer, a slight decrease occurred in the degree of polymerization of the polymer forming the polymer network.

[Additional Remarks]

According to the first embodiment, the present invention provides a camera module optical shutter including a pair of substrates bonded together with a seal and a polymer network liquid crystal layer sealed between the substrates, wherein at least one of the substrates includes a transparent electrode made of an oxide conductive film and a silicon oxide layer covering the transparent electrode, and a silane coupling agent is bonded to a surface of the silicon oxide layer, the surface being in contact with the polymer network liquid crystal layer.

In the first embodiment, the silane coupling agent may contain polymerizable groups, and the polymerizable groups may be bonded to the polymer network in the polymer network liquid crystal layer.

In the first embodiment, the polymer network liquid crystal layer may have a thickness of 10 to 25 μm.

In the first embodiment, the oxide conductive film may contain indium tin oxide, zinc oxide, or tin oxide. The transparent electrode may have a thickness of 5 to 50 nm.

In the first embodiment, the optical shutter may include one or more wall members disposed to surround the center of the polymer network liquid crystal layer in a region to be surrounded by the seal between the substrates. The wall members may be disposed to repeatedly surround the center of the polymer network liquid crystal layer.

In the second embodiment, the present invention provides a method for producing a camera module optical shutter, the method including applying a silane coupling agent to a silicon oxide layer of a first substrate including a transparent electrode made of an oxide conductive film and the silicon oxide layer covering the transparent electrode; disposing an uncured sealant in a frame shape on the first substrate; dropping a liquid crystal material containing a polymer network forming monomer into a region surrounded by the uncured sealant and coated with the silane coupling agent on the first substrate; overlaying a second substrate on the first substrate via the uncured sealant; and curing the uncured sealant and polymerizing the polymer network forming monomers in the liquid crystal material.

In the second embodiment, the silane coupling agent may contain polymerizable groups, and the polymerizable groups in the silane coupling agent may react with the polymerizable groups of the monomer during polymerization of the monomer-containing liquid crystal material.

In the second embodiment, the method may include forming one or more wall members on the first substrate, and the one or more wall members may be formed to surround the dropping position of the monomer-containing liquid crystal material in the region to be surrounded by the uncured sealant. The wall members may be disposed to repeatedly surround the dropping position of the monomer-containing liquid crystal material in the region to be surrounded by the uncured sealant.

What is claimed is:

1. A camera module optical shutter, comprising:
a pair of substrates bonded together with a seal; and a polymer network liquid crystal layer sealed between the substrates,
wherein at least one of the substrates includes a transparent electrode made of an oxide conductive film and a silicon oxide layer covering the transparent electrode,
a silane coupling agent is bonded to a surface of the silicon oxide layer, the surface being in contact with the polymer network liquid crystal layer,
the silane coupling agent contains polymerizable groups,
the polymerizable groups are bonded to a polymer network in the polymer network liquid crystal layer, and
the silane coupling agent is represented by the following structural formula (1), (2), (3), (5) or (6):

(1)

(2)

(3)

(5)

(6)

2. The camera module optical shutter according to claim 1,
wherein the polymer network liquid crystal layer has a thickness of 10 to 25 μm.

3. The camera module optical shutter according to claim 1,
wherein the oxide conductive film contains indium tin oxide, zinc oxide, or tin oxide.

4. The camera module optical shutter according to claim 1,
wherein the transparent electrode has a thickness of 5 to 50 nm.

5. The camera module optical shutter according to claim 1,
wherein the optical shutter comprises one or more wall members disposed to surround a center of the polymer network liquid crystal layer in a region surrounded by the seal between the substrates.

6. The camera module optical shutter according to claim 5,
wherein the wall members are disposed to repeatedly surround the center of the polymer network liquid crystal layer.

* * * * *